United States Patent [19]

Sturtevant

[11] Patent Number: 5,267,820
[45] Date of Patent: Dec. 7, 1993

[54] FASTENER ASSEMBLY FOR TRUCK BED LINER

[76] Inventor: Thomas Sturtevant, R.R. #1, Box 1550, South China, Me. 04358

[21] Appl. No.: 981,414

[22] Filed: Nov. 25, 1992

[51] Int. Cl.$^5$ ............................................. F16B 21/00
[52] U.S. Cl. ...................................... 411/551; 411/349
[58] Field of Search ............... 411/551, 555, 349, 347, 411/550, 549

[56] References Cited

U.S. PATENT DOCUMENTS

| | | | |
|---|---|---|---|
| 2,403,247 | 7/1946 | Sullivan | 411/551 |
| 3,956,803 | 5/1976 | Leitner | 411/349 |
| 4,181,349 | 1/1980 | Nix et al. | |
| 4,592,583 | 6/1986 | Dresen et al. | |
| 4,740,026 | 4/1988 | Wagner | 411/549 |
| 4,789,287 | 12/1988 | Le | 411/551 X |
| 4,830,316 | 5/1989 | Nehl | 411/551 X |
| 4,850,633 | 7/1989 | Emery | |

FOREIGN PATENT DOCUMENTS 838107  6/1981  U.S.S.R. ............................ 411/107

Primary Examiner—Rodney M. Lindsey
Attorney, Agent, or Firm—Frederick R. Cantor

[57] ABSTRACT

A fastener assembly for attaching a truck bed liner to a truck body, is described, which includes a support member, having a face plate and a trough-shaped wall, for supporting a linearly movable clamp member. The clamp member can be rotated within the trough, in order to swing a clamp arm upwardly to a generally vertical position, aligned with a downward lip, on a truck rail. A manual screw extends within the trough into a threaded hole in the clamp member, such that the screw can be rotated, to rotate the clamp arm, and then move it linearly along the trough, and into clamping engagement with the rail lip. The fastener assembly is a self-contained unitary structure, that can be installed through a circular opening in the bed liner side wall, after the liner is placed in position within the truck bed.

8 Claims, 2 Drawing Sheets

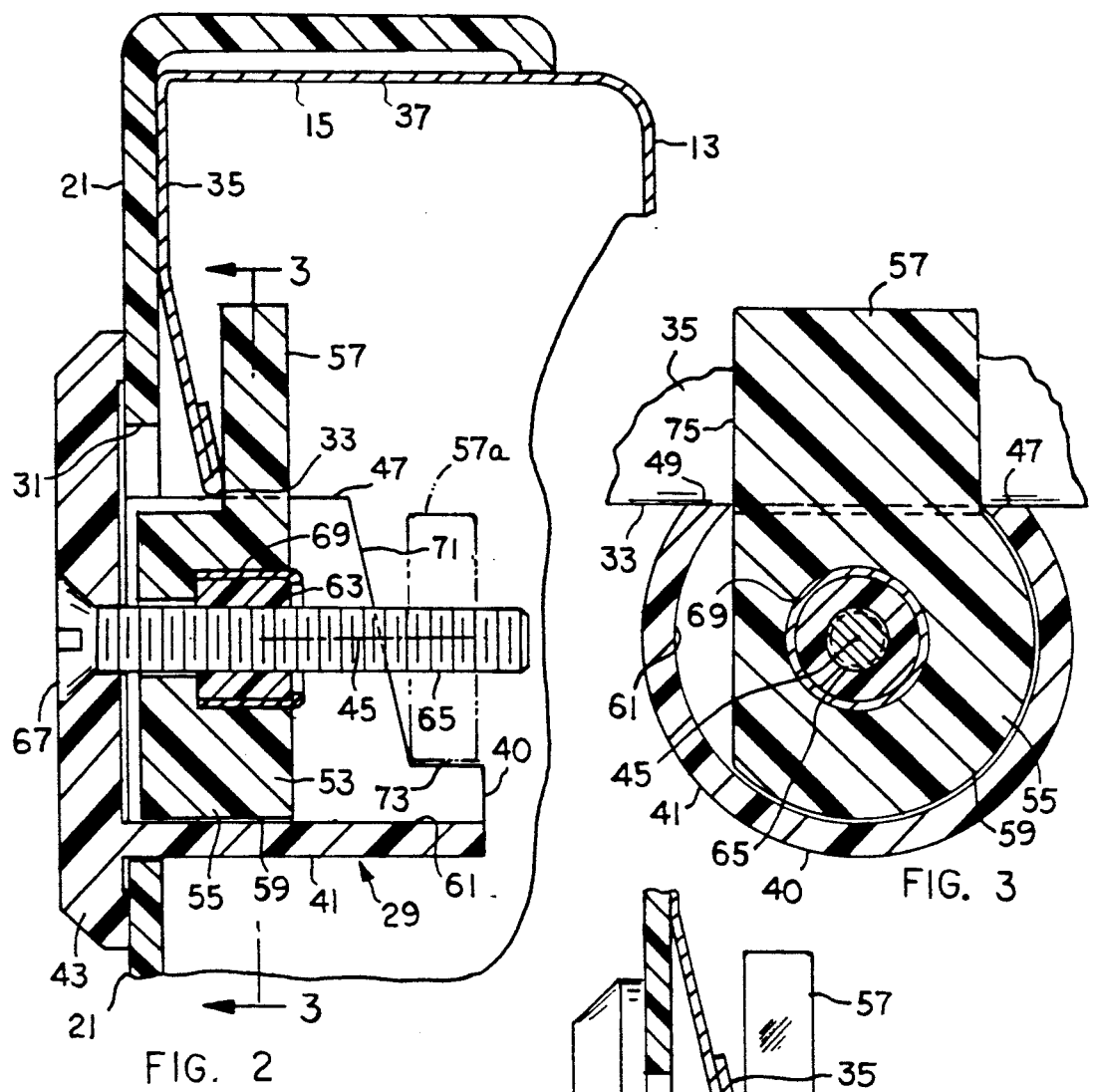
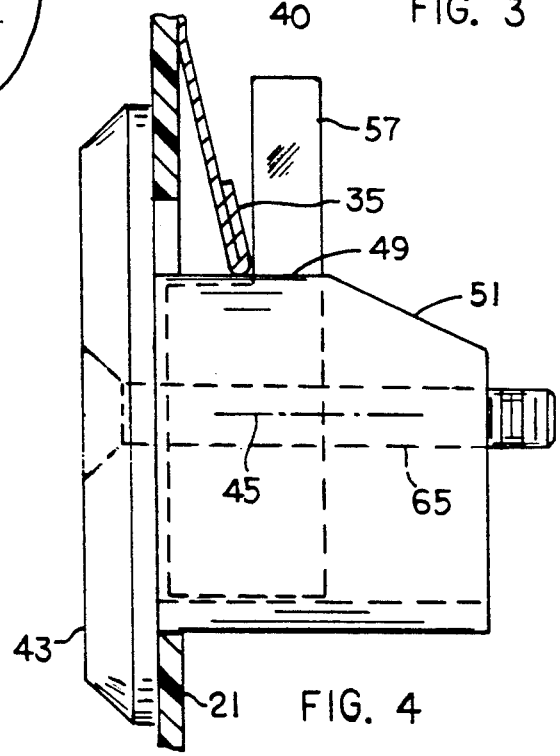

FASTENER ASSEMBLY FOR TRUCK BED LINER

BACKGROUND OF THE PRESENT INVENTION

The present invention relates to truck bed liners.

The present invention, more particularly, relates to a non-invasive fastener assembly for securing a truck bed liner within a truck bed.

Various patents have been granted in the field of truck bed liners. U.S. Pat. No. 4,181,349, issued to E. L. Nix, on Jan. 1, 1980, discloses a truck bed liner that includes upstanding side walls, having outwardly directed flanges, adapted to overlie the side rails of a truck bed, or cargo box. The truck bed liner is held in place by means of screw-expansion nut assemblies, extending downwardly through the liner flanges, into stake pockets provided in the truck side wall. This invasive arrangement is disadvantageous, in that the head of each screw is visible, so as to detract from the bed liner appearance. Additionally, the holes required in the liner flanges, for seating the heads of the screws, constitute leakage paths for rain water into the stake pockets and interior spaces within the truck side wall.

U.S. Pat. No. 4,592,583, issued to W. L. Dresen, on June 3, 1986, discloses a truck bed liner, that is fastened to the truck bed, by means of metal screws, extended through the liner bottom wall, into holes drilled in the truck bed. This is disadvantageous in that the installer is required to invasively drill the holes into the truck bed. Additionally, the holes in the liner bottom wall can transmit rain water onto the floor of the truck bed, thereby contributing to possible corrosion of the bed surface.

U.S. Pat. No. 4,850,633, issued to P. L. Emery, on July 25, 1989, discloses a truck bed liner that is fastened to the truck bed by means of a series of screw-nut assemblies, installed through the liner side walls, so as to exert clamp action on rail structures formed at the upper ends of the truck bed side walls. Each nut comprises a U-shaped metal clip, captively positioned on a plastic clamp body. The clamp body is acutely angled to the screw axis, such that when the screw is manually turned, the clamp body rocks around a contact point below the screw axis, thereby causing an upper end of the clamp body to exert a clamp force on a downwardly extending lip portion of an associated rail structure.

One disadvantage of the fastener assembly shown in the Emery patent, is the fact that the screw and clamp body must be assembled together, from opposite surfaces of the liner side wall. The screw has to be pushed through a small opening in the liner side wall, and threaded into a nut-clamp body unit while the unit is held manually against the remote surface of the liner side wall. It is sometimes difficult to accurately align the end of the screw, with the nut threads, so as to make the desired connection.

Another disadvantage of the fastener system shown in U.S. Pat. No. 4,850,633, is that all of the screw-clamp body assemblies must be loosely attached to the bed liner, prior to placement of the liner in the truck bed (cargo box). If the installer inadvertently fails to loosely attach one, or more, of the screw-clamp body assemblies to the liner, prior to the placement of the liner in the cargo box, then the liner must be lifted out of the cargo box, in order to attach the missed screw-clamp body assembly.

A further disadvantage of the fastener assembly, disclosed in the Emery patent, relates to the fact that the head of the screw is at an oblique angle to the surface of the bed liner, such that the head does not effectively seal around the screw hole in the liner wall, allowing moisture to seep through the hole. Also, the projecting screw head can obstruct the movement of cargo along the bed liner surface. The oblique angle taken by the screw head, is also believed to be disadvantageous, in that the uneven pressure of the screw head on the bed liner surface can, theoretically, produce some warpage of the bed liner wall, especially if the screw is overtightened. In extreme "over-torqued" situations the single thread used in the sheet metal nut could be stripped into a failure condition.

Additionally, the fastener assembly of the present invention is designed so as to allow normal expansion, and contraction, of the truck bed liner, thereby preventing cracking of the bed liner material, yet securely holding the bed liner in position.

The present invention relates to a truck bed liner fastener assembly, designed to overcome most of the problems associated with the above-described truck bed liner fastener mechanisms.

SUMMARY OF THE PRESENT INVENTION

An object of the present invention is to provide a fastener assembly to secure a truck bed liner, within a truck bed, or cargo box.

A further object of the present invention is to provide a non-invasive fastener assembly for securing a truck bed liner within a truck bed.

The present invention contemplates a truck bed liner fastener assembly, that includes a support member, having a circular face plate, and an upwardly open trough structure. The trough structure preferably comprises an arcuate C-shaped wall, having a diameter mated to the diameter of a circular opening formed in the side wall of a truck bed liner. Typically, the circular opening in the liner, will have a diameter of about one and one-half inches. The C-shaped wall will have a clearance fit in the opening, such that, the C-shaped trough structure can be manually inserted, through the opening, in order to bring the face plate into facial engagement with a face of the truck bed liner wall. The diameter of the face plate may be about two and one-quarter inches thick.

The trough structure, forms a support surface for a clamp member, that includes a mounting portion, mated to the trough interior surface contour. The clamp member can be moved linearly, back and forth, within the trough structure. A clamp arm extends laterally from the mounting portion of the clamp member, such that, when the clamp member is drawn toward the bed liner side wall, the clamp arm exerts a clamp force on an intervening lip portion of a truck side rail. Movement of the clamp member is produced by manual rotation of a screw that extends through the face plate, into a threaded hole in the clamp member. The screw is located on the center-line of the trough, so as to prevent cocking of the clamp member, in the trough.

A feature of the fastener assembly of the present invention, is that the assembly can be installed on the bed liner, after the bed liner has been placed in the truck bed, i.e., by inserting the fastener assembly through an opening in the liner side wall. The fastener assembly is a unitary multi-piece construction that can be handled and installed without having to thread the screw into the clamp member, as the screw is permanently connected to the clamp member.

A further feature of the fastener assembly described herein, is that it can be installed without any requirement for invasively drilling holes in the truck bed. The fastener assembly is, therefore, a non-invasive fastener construction, that clamps the bed liner securely to the truck bed, without special mounting holes in the truck bed.

The fastener assembly is designed so that the circular face plate has facial contact with the bed liner side wall, around the entire peripheral edge of the face plate, whereby the plate seals against entry of moisture into the opening in the bed liner side wall. The clamp force is applied on a line coincident with the axis of the trough structure and face plate, such that the face plate has a relatively uniform pressure on the liner side wall, at all points around the face plate periphery. Warpage of the bed liner side wall is, therefore, not a problem.

In summary, and in accordance with the above discussion, the foregoing objectives are achieved in the following embodiments.

1. A fastener assembly, for securing a truck bed liner within a truck bed, wherein said truck bed, comprises, two horizontal rails, each horizontal rail, including an upper wall, and a downwardly extending lip, having a lower edge, and wherein said liner, comprises, upstanding side walls and outwardly extending flanges, adapted to overly the rail upper walls, when the liner is installed within the truck bed; said fastener assembly, comprising an opening, extending through a liner side wall, in intersecting relation to a lower edge of an associated rail lip; a support member, comprising an upwardly open trough means and a face plate, extending normal to the trough axis; a clamp member, comprising a mounting portion seated within said trough, and an arm extending from said mounting portion, out of said trough, said mounting portion having a threaded hole, located on the trough axis; and a screw extending through said face plate, into said threaded hole, on a line coincident with said trough axis; said support member being insertable through said opening in the liner side wall, so that said face plate seats flatwise, against the liner side wall, and said trough means has edge contact with the lower edge of said associated rail lip; said screw being turnable, in order to swing said clamp member from a first position, in which said arm is essentially horizontal, to a second position, in which said arm is essentially vertical; and said screw being turnable to exert a pulling force on said clamp member, whereby said arm moves linearly through the upwardly open trough, to exert a clamp force on said associated rail lip.

2. The fastener assembly, as described in paragraph 1, wherein said opening is circular, and said trough means comprises an arcuate C-shaped wall, having the same diameter as said opening, whereby said C-shaped wall has a close sliding fit in said opening.

3. The fastener assembly, as described in paragraph 2, wherein said C-shaped wall, has two laterally spaced edges, that face upwardly to have edge contact with the lower edge of said rail lip.

4. The fastener assembly, as described in paragraph 3, wherein said C-shaped wall, has an arcuate interior surface, centered on said trough axis, and said mounting portion of said clamp member has an arcuate edge surface, having a clearance fit on said arcuate interior surface.

5. The fastener assembly, as described in paragraph 1, wherein said trough means, has a recess spaced from said face plate, to form an upwardly-facing shoulder, located in a plane below said trough axis, said shoulder constituting a support means for said arm when said arm is in its horizontal position.

6. The fastener assembly, as described in paragraph 5, wherein said support member is a one-piece plastic molding.

7. The fastener assembly, as described in paragraph 1, wherein said opening is circular, and said trough means comprising an arcuate C-shaped wall, having the same diameter as said opening, whereby said C-shaped wall has a close sliding fit in said opening; said C-shaped wall having two laterally spaced edges that face upwardly so as to have edge contact with the lower edge of said rail lip; and one of said upwardly-facing edges having a recess therein, forming a shoulder below the plane of said trough axis, said shoulder constituting a support means for said arm, when the arm is in its horizontal position.

8. The fastener assembly, as described in paragraph 7, wherein said C-shaped wall has an arcuate interior surface, centered on said trough axis, and said mounting portion of said clamp member has an arcuate peripheral surface, having a clearance fit on said arcuate interior surface.

A BRIEF DESCRIPTION OF THE DRAWINGS

FIG. 2, is an enlarged sectional view, taken through one of the assemblies shown in the FIG. 1 bed liner system.

FIG. 3, is a transverse sectional view, taken along line 3—3, in FIG. 2.

FIG. 4, a side elevational view, of the fastener assembly, shown in FIG. 2.

Figure 5:
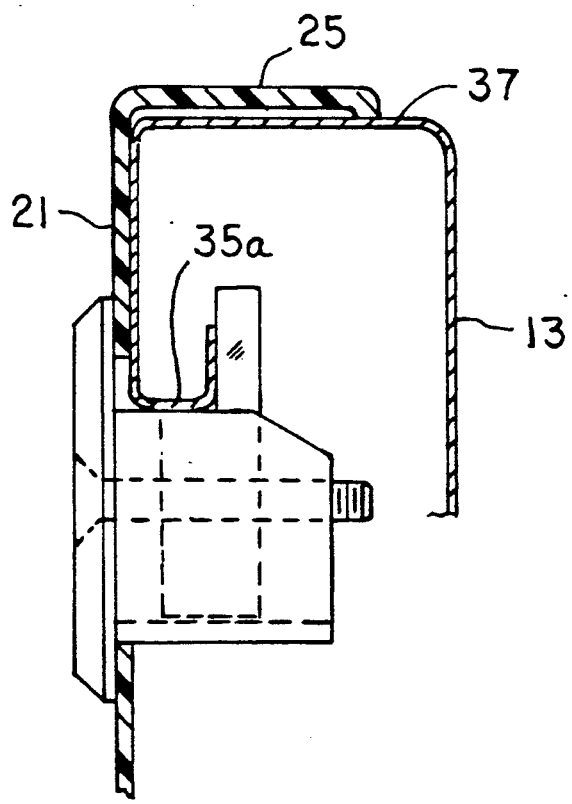

FIG. 5, is a view, taken in the same direction as FIG. 4, but showing the fastener assembly, connected to a differently constructed truck bed rail structure.

DESCRIPTION OF THE PREFERRED EMBODIMENTS OF THE PRESENT INVENTION

Figure 1:
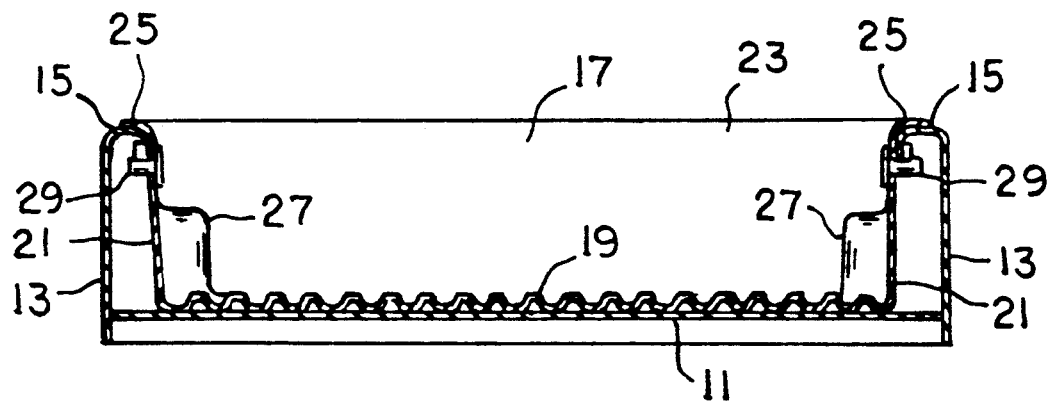
FIG. 1, is a transverse sectional view, through a conventional truck bed and bed liner, mounted therein, by means of the fastener assemblies of the present invention.

FIG. 1, is a transverse sectional view, through a conventional truck bed and bed liner, mounted therein, by means of the fastener assemblies of the present invention.

FIG. 1, is a transverse sectional view, taken through a conventional truck bed, for a pick-up truck. The term "truck bed" is used herein, synonymously with the term "cargo box." As shown in FIG. 1, the truck bed comprises a floor 11, and two upstanding side walls 13. Each side wall 13, is inturned at its upper-edge, in order to form a horizontal side rail 15. The front wall of the truck bed, or cargo box, is left open, to accommodate a tailgate, not shown.

The present invention is, more particularly, concerned with a truck bed liner, designated generally by numeral 17. The bed liner 17, comprises a corrugated floor 19, two upstanding side walls 21, and an upstanding front wall 23. Each upstanding side wall 21 has an outwardly directed flange 25, at its upper edge, adapted to overlie the associated side rail 15, of the truck bed. Bed liner side walls 21, have recessed areas 27, adapted to fit over the outer surfaces of the truck bed wheel wells, not shown.

In a preferred arrangement, the truck bed liner 17, is a one-piece plastic structure, mated to the interior dimensions of the truck bed, such that the bed liner 17, can be lowered into the truck bed, so that the bed liner floor 19, rests on the upper surfaces of side rails 15. The bed liner 17, is held in place by means of fastener assemblies 29, extended through liner side walls 21, to interlock with the truck side rails 15. Typically, there will be three similarly constructed fastener assemblies 29, spaced along the length of each liner side wall 21, i.e., a total of six fastener assemblies 29. Certain liners may require utilization of a different number of fastener assemblies 29.

FIG. 2, is an enlarged sectional view, taken through one of the fastener assemblies shown in the FIG. 1 bed liner system.

FIG. 3, is a transverse sectional view, taken along line 3—3, in FIG. 2.

FIG. 4, is a side elevational view, of the fastener assembly, shown in FIG. 2.

The present invention is most particularly concerned with the fastener assembly construction, as best shown in FIGS. 2 through 4. A representative fastener assembly 29, comprises a circular opening 31, formed in liner side wall 21, so as to intersect with the lower edge 33, of a downturned lip 35, that forms part of the truck side rail 15. The truck side rail 15, comprises an upper flat wall 37, and the downturned lip 35.

As shown in FIGS. 2 and 5, the bed liner side wall 21, has an outwardly extending flange 25, adapted to overlie side rail upper wall 37, when the truck bed liner 17, is installed within the truck bed.

Fastener assembly 29, comprises a support member 40, that includes an upwardly open trough means 41, integrally connected to a circular face plate 43. As shown in FIG. 3, trough means 41, comprises an arcuate C-shaped wall, centered on an imaginary central axis 45, that is coincident with the axis of circular face plate 43. The C-shaped wall has two laterally spaced edges 47 and 49, that face upwardly to have edge contact with the lower edge 33, of rail lip 35, when the trough-shaped support member 40, is inserted through circular opening 31, in liner side wall 21. Edge 49, of the C-shaped wall, is sloped downwardly, as at 51, to facilitate insertional motion of the support member 40, through circular opening 31, without undue interference from the lower edge of rail lip 35. Additionally, manual hand pressure may be applied to the upper surface of liner flange 25, in order to bring circular opening 31 downwardly, relative to lower edge 33 of rail lip 35. When support member 40, is in its installed position, the upwardly-facing edge areas 47 and 49, of the C-shaped wall, are engaged with the lower edge 33, of rail lip 35.

The trough formed by support member 40, supports a clamp member 53, that comprises a mounting portion 55, seated within the trough, and an arm 57, extending from the mounting portion 55, out of the trough. Mounting portion 55, of the clamp member 53, has an arcuate peripheral edge surface 59, centered on central axis 45, so as to have a clearance fit on arcuate interior surface 61, of C-shaped wall 41.

Clamp member 53, has a plastic insert 63, formed of a low friction, wear resistant material, e.g., nylon, said insert 63, having a threaded hole in mesh, with a metal screw 65. As shown in FIG. 2, screw 65, has a head 67, located within the plane of face plate 43, and a threaded shank, extended into the threaded hole, in insert 63. The plastic insert 63, is reinforced against radial deformation by means of a metal sleeve 69, surrounding the insert 63.

Screw 65, is turnable to advance clamp member 53, toward rail lip 35 so that arm 57, exerts a clamp force on the lower lip edge 33. However, prior to initial advancement of the clamp member 53, toward rail lip 35, the clamp member 53, is oriented within the C-shaped trough, so that arm 57, is in an essentially horizontal position, as indicated by dashed line 57a, in FIG. 2. Such an orientation of the clamp arm 57, is necessary, in order to permit initial insertional movement of the support member 40, and clamp member 53, through circular opening 31.

The C-shaped trough wall 41, has a recess 71, in its upwardly-facing edge 47, said recess 71, forming an upwardly-facing shoulder 73, for supporting clamp arm 57, in its horizontal position 57a. As viewed in FIG. 2, shoulder 73, is located below the plane of central trough axis 45, so as to have sufficient space for accommodating arm 57, in its prone, horizontal position.

Initial manual turning of screw 65, causes clamp member 53 to rotate, until the flat edge 75, of the clamp member 53, strikes the upper edge 49, of C-shaped wall 41. Thereafter, continued manual rotation of the screw 65, causes clamp member 53, to move linearly along the upwardly open trough, in order to exert a clamp force on the associated rail lip 35.

The close sliding fit of clamp surface 59, on interior surface 61, of the trough wall, is advantageous, in that cocking, or tilting, of the clamp member 53, from its FIG. 2 centered position, is prevented.

To disengage the fastener assembly 29, from its installed position, screw 65, is rotated in a reverse direction, such that clamp member 53, is moved linearly in the supporting trough, away from rail lip 35. When arm 57, reaches recess 71, in trough edge 47, the arm 57, automatically swings down, into its prone horizontal position 57a. The fastener assembly 29, can then be drawn through circular opening 31, in a right-to-left direction, by suitable manipulation of the fastener assembly 29. Circular opening 31, has a relatively large diameter, preferably about one and one-half inches, which facilitates manipulation of the fastener assembly 29, through the opening.

The fastener assembly 29, is a unitary, multi-piece construction that can be handled as a unit. It is not necessary to disassemble the clamp member 53, from support member 40, in order to install, or remove, the fastener assembly 29. Each fastener assembly 29, is individually installed, after the bed liner is placed within the truck bed. It is not necessary to connect the fastener assembly 29, to the bed liner, prior to the placement of the bed liner in the truck bed, as in the arrangement shown in the aforementioned U.S. Pat. No. 4,850,633.

FIG. 5, is a view, taken in the same direction as FIG. 4, but showing the fastener assembly, connected to a differently constructed truck bed rail structure.

FIG. 5, shows the fastener assembly 29 of the present invention installed on a truck bed liner, that is used within a differently configured truck bed. As shown, the truck bed rail includes a depending lip 35a, having a channel cross-section. The fastener assembly 29, has a capability for extended linear movement of the clamp arm 57, such that the fastener assembly can adapt to varying rail lip thicknesses.

The present invention relates to a fastener assembly for securing a truck bed liner to the bed of a truck. Features of the present invention are recited in the appended claims. The drawings contained herein necessarily depict certain structural features and embodiments of the apparatus, useful in the practice of the present invention.

However, it will be appreciated by those skilled in the arts pertaining thereto, that the present invention can be practiced in various alternate forms and configurations. Further, the previous detailed descriptions of the preferred embodiments of the present invention, are presented for purposes of clarity of understanding only, and no unnecessary limitations should be understood or implied therefrom. Finally, all appropriate mechanical and functional equivalents to the above, which may be obvious to those skilled in the arts pertaining thereto, are considered to be encompassed within the claims of the present invention.

What is claimed is:

1. A fastener assembly, for securing a truck bed liner within a truck bed, wherein said truck bed, comprises, two horizontal rails, each horizontal rail, including an upper wall, and a downwardly extending lip, having a lower edge, and wherein said liner, comprises upstanding side walls and outwardly extending flanges, adapted to overly the rail upper walls, when the liner is installed within the truck bed; said fastener assembly, comprising an opening, extending through a liner side wall, in intersecting relation to a lower edge of an associated rail lip; a support member, comprising an upwardly open trough means and a face plate, extending normal to the trough axis; a clamp member, comprising a mounting portion seated within said trough, and an arm extending from said mounting portion, out of said trough, said mounting portion having a threaded hole, located on the trough axis; and a screw extending through said face plate, into said threaded hole, on a line coincident with said trough axis; said support member being insertable through said opening in the liner side wall, so that said face plate seats flatwise, against the liner side wall, and said trough means has edge contact with the lower edge of said associated rail lip; said screw being turnable, in order to swing said clamp member from a first position, in which said arm is essentially horizontal, to a second position, in which said arm is essentially vertical; and said screw being turnable to exert a pulling force on said clamp member, whereby said arm moves linearly through the upwardly open trough, to exert a clamp force on said associated rail lip.

2. The fastener assembly, as described in claim 1, wherein said opening is circular, and said trough means comprises an arcuate C-shaped wall, having the same diameter as said opening, whereby said C-shaped wall has a close sliding fit in said opening.

3. The fastener assembly, as described in claim 2, wherein said C-shaped wall, has two laterally spaced edges, that face upwardly to have edge contact with the lower edge of said rail lip.

4. The fastener assembly, as described in claim 3, wherein said C-shaped wall, has an arcuate interior surface, centered on said trough axis, and said mounting portion of said clamp member has an arcuate edge surface, having a clearance fit on said arcuate interior surface.

5. The fastener assembly, as described in claim 1, wherein said trough means, has a recess spaced from said face plate, to form an upwardly-facing shoulder, located in a plane below said trough axis, said shoulder constituting a support means for said arm when said arm is in its horizontal position.

6. The fastener assembly, as described in claim 5, wherein said support member is a one-piece plastic molding.

7. The fastener assembly, as described in claim 1, wherein said opening is circular, and said trough means comprising an arcuate C-shaped wall, having the same diameter as said opening, whereby said C-shaped wall has a close sliding fit in said opening; said C-shaped wall having two laterally spaced edges that face upwardly so as to have edge contact with the lower edge of said rail lip; and one of said upwardly-facing edges having a recess therein, forming a shoulder below the plane of said trough axis, said shoulder constituting a support means for said arm, when the arm is in its horizontal position.

8. The fastener assembly, as described in claim 7, wherein said C-shaped wall has an arcuate interior surface, centered on said trough axis, and said mounting portion of said clamp member has an arcuate peripheral surface, having a clearance fit on said arcuate interior surface.

* * * * *